US006416844B1

(12) United States Patent
Robson

(10) Patent No.: US 6,416,844 B1
(45) Date of Patent: Jul. 9, 2002

(54) APPARATUS WITH FUNCTIONAL SYMBOLS ADAPTED TO BE ILLUMINATED BY ASSOCIATED TRANSMITTED LIGHT AND METHOD FOR MAKING SAME

(75) Inventor: Thomas Robson, Houghton le Spring (GB)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/403,656

(22) PCT Filed: Apr. 6, 1998

(86) PCT No.: PCT/DE98/00972

§ 371 (c)(1),
(2), (4) Date: Feb. 7, 2000

(87) PCT Pub. No.: WO98/49700

PCT Pub. Date: Nov. 5, 1998

(30) Foreign Application Priority Data

Apr. 25, 1997 (DE) ........................................ 197 17 636

(51) Int. Cl.$^{7}$ ............................. B32B 3/10; B05D 1/38

(52) U.S. Cl. ....................... 428/142; 428/156; 428/161; 428/195; 428/203; 427/164; 427/261; 427/265

(58) Field of Search ................................ 427/264, 265, 427/270, 555, 164, 261; 428/134, 156, 142, 161, 141, 195, 203, 77

(56) References Cited

U.S. PATENT DOCUMENTS 4,968,526 A * 11/1990 Takii et al. ................ 427/53.1
5,040,479 A * 8/1991 Thrash ....................... 116/279
5,095,409 A * 3/1992 Dematteo et al. ............. 362/23
5,120,920 A * 6/1992 Moriike ...................... 200/341
5,404,133 A * 4/1995 Moriike et al. ........ 340/815.56
5,432,684 A * 7/1995 Fye et al. ..................... 362/30
5,477,024 A * 12/1995 Share et al. ........... 219/121.69
5,723,843 A * 3/1998 Muggli .................. 219/121.69
6,196,738 B1 * 3/2001 Shimizu et al. ............. 400/490

* cited by examiner

*Primary Examiner*—Shrive P. Beck
*Assistant Examiner*—Kirsten A. Crockford
(74) *Attorney, Agent, or Firm*—Fay, Sharpe, Fagan, Minnich & McKee, LLP

(57) ABSTRACT

A head lamp piece, actuating piece, or similar piece with functional symbols adapted for illumination with transmitted light and a method of manufacturing same is provided. A support element (1) is formed in such a manner that there is provided on the surface (5) thereof within at least one predetermined area, a first raised structure (7) corresponding to the shape of at least one first function symbol (9, 11). One or more temperature stable color layers (13, 15) are applied on the support element (1) in the first predetermined area. The surface (5) of the support element (1) is covered by a non-transparent material (17) leaving the raised structures (7) and color layers (13, 15) uncovered. The top surface (7*a*) of the color layer extends essentially parallel to the surface (5) of the support element (1) and remains free of non-transparent material (17). The method further includes producing pieces having different color function symbols, wherein different color layers are applied next to each other or on top of each other onto a support element. Thereafter, the stacked color layers are covered by a non-transparent color layer whereupon one or more of the color layers or non-transparent color layer is selectively removed exposing color layers in areas where the function symbols are to be produced.

13 Claims, 1 Drawing Sheet

APPARATUS WITH FUNCTIONAL SYMBOLS ADAPTED TO BE ILLUMINATED BY ASSOCIATED TRANSMITTED LIGHT AND METHOD FOR MAKING SAME

BACKGROUND OF THE INVENTION

The subject invention is directed to the art of the manufacture of head lamp pieces, actuating pieces, or similar device provided with function symbols adapted to be illuminated by transmitted light.

Devices and methods of manufacture of the type under consideration are commonly used, for example, in association with motor vehicles for visualization of functions of motor vehicle sub-systems such as heating, illumination, or rear window heating functions. The method of manufacture produces device that are particularly well suited for application in motor vehicles and, accordingly, the invention will be described with particular reference thereto. However, it is to be understood that the invention has broader application and can be used to manufacture other luminous-type devices such as keypad keys or the like or any devices where functional symbols are to be displayed and/or illuminated by transmitted light.

One requirement for devices manufactured according to the method under consideration is sufficient visual contrast between the functional symbols and the immediate surroundings during daylight. During night time, it is also important for the device to be capable of providing adequate transmission of transmitted light when illuminated by an associated light source from behind.

Accordingly, it has been proposed to coat a homogeneous transparent and colored insert piece with a plastic material using an extrusion process. Typically, the plastic material includes raised structures formed on its surface, the raised structures corresponding in overall shape to the intended functional symbols. Typically, the surface of the colored insert piece provided with raised structures is, in part, covered with a non-transparent material. The coating process is performed in such a manner that the surfaces of the raised structures are disposed in a flush relative relationship with the surface of the extrusion-coated non-transparent material.

One disadvantage found in the above method however, is that the uniformly colored transparent insert piece can be only slightly tinted in order to assure adequate transmission of light with trans-illumination. In this case, however, the functional symbols visually contrast only slightly in direct light, such as, for example in daylight. In addition, due to variable thickness conditions, a visual perception of irregular color may result. Still further, it is very difficult using the above method to produce different colored symbols using a single insert piece. Although it is possible to use several different color insert pieces, the result is a correspondingly higher production cost.

In another method for the production of switch lenses, the functional symbols are produced by means of a multi-layer, color-imprinted plastic foil. The foil is either colored or made light-permeable only in selected areas where the functional symbols are to be located and dyed black in the remaining areas. The foil is extruded onto one side of a transparent plastic material in the areas of the device where the functional symbols are located.

One drawback with the above method, however, is that due to the extrusion from behind of the plastic foil with plastic material, particularly in cases where the finished element does not have a level surface, the foil is oftentimes stretched thus distorting the functional symbols or producing fluctuations in the thickness of the function symbols due to extension of the foil. The fluctuations in thickness result in an irregular transparency of the foil in areas of the stretched function symbols.

Lastly, another method is known for manufacturing a device of the type under consideration. The method first coats a first element consisting of clear plastic with a light, transparent color, for example white. The color coating is further covered with another non-transparent contrasting color layer such as, for example black. The function symbols are then created by removing selected areas of the non-transparent color layer to a depth up to and/or reaching into the transparent color layer.

The above method offers the benefit that due to the low thickness of the color layer, it is possible to utilize a relatively intensive color with high dye or pigment contents. This leads to a favorable compromise between an acceptably low dimming in trans-illumination and a relatively high reflection with direct light. Thus, adequate contrast can be assured in daylight as well as with illumination by transmitted light at night time or when it is dark. However, the method is very expensive and, by virtue of the method steps for manufacturing the end product, permits only the formation of function symbols having a single uniform color.

Accordingly, there is a need in the art for a method of manufacturing headlamp pieces, actuation pieces or similar pieces with function symbols for illumination with transmitted light which enables, in a very simple and cost-effective manner, manufacture of multi-color function symbols in a single basic piece. There is further a need for devices produced using the method.

SUMMARY OF THE INVENTION

The subject invention provides a method of manufacturing an apparatus with functional symbols adapted to be illuminated by transmitted light. The method includes providing a transparent support element having a first surface and at least one first raised structure extending from the first surface in a predefined area. The at least one first raised structure is shaped to represent at least one functional symbol on the transparent support element. A first transparent color layer is applied onto the at least one first raised structure in the predefined area. The first transparent color layer defines a second surface substantially parallel with the first surface. Lastly, the first surface of the transparent support element is covered with a non-transparent material in selected areas adjacent the at least one first raised structure without covering the second surface in a manner leaving the second surface exposed between portions of the non-transparent material disposed on the support element. Preferably, the outer surface of the non-transparent material extends up to but not beyond the second surface so that the resultant apparatus produced according to the method has a substantially planar face that is easily cleaned and that discourages accumulation of dust and dirt.

In accordance with a first specific embodiment of the invention, a transparent color layer is applied onto a clear or colored transparent insert piece. The insert piece has, on its surface, raised structures formed in the shaped of function elements. The transparent color layer is applied at least in the areas of the raised structures of the function elements to be produced. Thereafter, a non-transparent contrasting color layer is applied in a known fashion onto the surface of the insert piece in such a manner that the externally oriented surfaces of the raised structures remain free from covering by the non-transparent contrasting layer.

One significant advantage of the above method of manufacturing apparatus with functional symbols of the type under consideration is that it is not necessary to apply the transparent color with great precision. Rather, the function symbols are created with appropriate accuracy by means of the overall coating process in combination with the shape of the raised structures. Thus, the application of the transparent color layer relative to the surface of the function symbols can be performed over a large area. Thus, as a result, a more uniform thickness is attained and, consequently, a more uniformly illuminated symbol as well as a more uniform visual color perception and effect is enabled.

In accordance with the invention, when the function symbols are to be produced having the same color, the entire surface of the insert piece is coated with a single color layer. By applying several colors for different raised structures, multi-color designs are produced in a simple fashion inasmuch as the color layers need not have great precision in the marginal areas and, may selectively overlap.

In accordance with another aspect of the invention, the production of function symbols using different colors on a single insert piece is enabled in a simple fashion because the function symbols of the insert piece for the areas corresponding to the structures are each respectively provided with a single color layer in the desired color. Thereby, the application of the color layers, in turn, is performed without great demands as to accuracy in precision of placement of the color layers.

In accordance with another specific embodiment of the invention, the application of the non-transparent color layer is performed by extrusion coating the support element which serves as an insert piece in a manner that the surface of the non-transparent material is formed flush with the surface of the raised structure. This results in an extremely cost-effective manufacturing process, whereby the required injection mold can also be made of a simple design.

According to the invention, the method employs a color material which is known from the laser etching process. Preferably, the color material has a specific temperature stability of greater than 80° C.

In accordance with another aspect of the present invention, in order to produce function symbols having a first color, an appropriate transparent color layer in said first color is selectively applied onto areas of the support element. The support element is thereafter coated with a non-transparent color layer without covering the colored portions thereof. To produce function symbols in the first color, the non-transparent color layer is thereafter selectively removed down to a depth exposing the transparent color layer. To produce additional function symbols in another color, multiple colors are first laid down in a stack. Thereafter, each color layer is selectively removed to depths exposing the desired color, down to the transparent support element whereupon a functional symbol is formed having the color of the support element. In areas of the insert piece where the transparent color layer is present together with the non-transparent color layer, both color layers are removed in selected regions to obtain the appropriate desired function symbol. In areas in which only the non-transparent color layer is present, only the non-transparent color layer needs to be removed in selected areas to achieve the desired function symbols having the color of the support element.

In accordance with another aspect of the invention, the transparent support element is tinted in order to tint the function symbols. Such symbols are produced by removal of all of the color layers from above the support element in selected areas to obtain the desired function symbol shaped.

In accordance with yet a further aspect of the invention, the manufacture of different color function symbols is also performed by applying, onto the transparent support element, two or more transparent color layers of different colors essentially next to each other and/or with minor overlapping of the color layers. The multiple color layers are subsequently color covered with a non-transparent color layer. Thereafter, the differently colored function symbols are then produced by selectively removing layers by first removing the superposed non-transparent color layer and thereafter removing additional layers until the desired color layer is exposed.

In accordance with yet a still further aspect of the invention, the manufacture of different color function symbols is also performed by applying several different transparent color layers on top of each other onto the surface of the support element. The creation of different color function symbols, following coating with a non-transparent layer, is then accomplished in such a manner that in each case, all color layers are removed above the particular transparent layer of color in which the respective symbol is to be created. That is, the stacked color layers are selectively removed, one after another, until the desired color of the function symbol is exposed.

In each of the above instances, the support element is preferably transparent in color, at least in the area of one or several of the function symbols. Preferably, laser etching is employed for the removal of the one or more color layers in the areas of the function symbols.

In accordance with yet another specific embodiment of the invention, the transparent and/or non-transparent layers are formed by appropriately stained transparent foils or non-transparent foils.

As can be seen from the foregoing, a primary object of the invention is the provision of an apparatus with function symbols for illumination by transmitted light and a method of manufacturing same. The manufacturing method enables an easy and cost effective process for producing such an apparatus.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, and wherein.

DETAILED DESCRIPTION OF THE PREFERRED EMBODIMENTS

Figure 1:
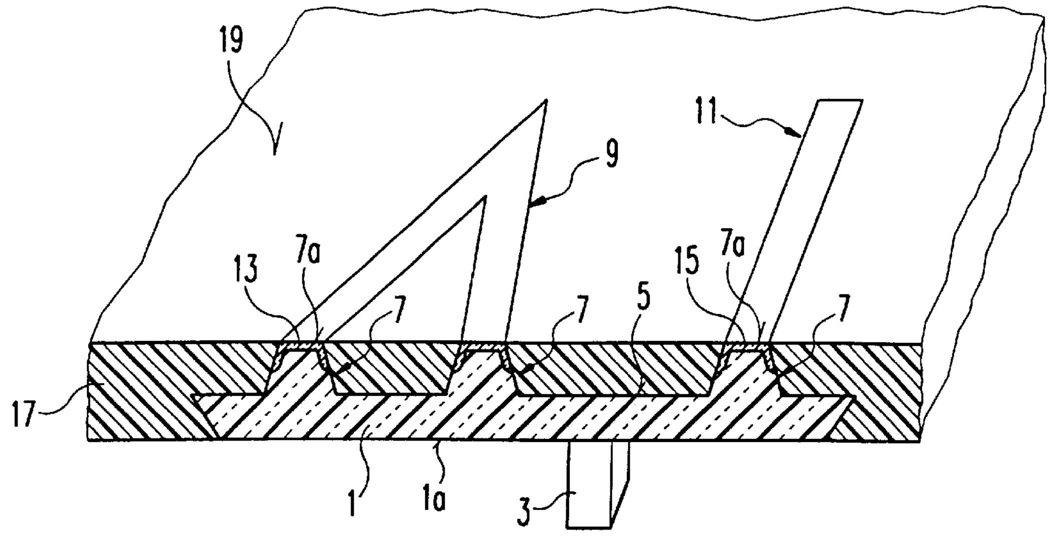
FIG. 1 is a perspective representation in partial cross section of an actuation piece or the like with function symbols formed by extrusion-coating an insert piece in accordance with a first embodiment of the invention.

Referring now to the drawings wherein the showings are for the purposes of illustrating the preferred embodiments of the invention only and not for purposes of limiting same, FIG. 1 shows a perspective representation in partial cross section of a head lamp piece, actuation piece, or the like produced in accordance with a first preferred method of the invention. An insert piece 1, preferably formed of a transparent synthetic material, is produced by means of an extrusion process. The insert piece 1 can be made of totally clear material or, if desired, of a transparent colored material. The bottom side of the insert piece 1 includes an extension member 3 which serves during the subsequent extrusion-coating of the insert piece for fastening or fixing the insert piece 1 in an associated injection mold apparatus.

With continued reference to FIG. 1, the insert piece 1 has, on its surface 5, a plurality of raised structures 7. As shown, the plurality of raised structures have top surfaces that extend essentially in parallel with the surface of the insert piece 1. Further, as can be seen, the plurality of raised structures are formed in a shape to correspond with the desired shape and arrangement of the manufactured function symbols 9, 11.

Following manufacture and providing of the insert piece 1, the same is coated with one or more transparent colored layers 13, 15, preferably at least in the areas of the surfaces of the raised structures 7.

The thickness or condition of the colored layers 13, 15 is selected in such a manner that, on the one side, there is produced sufficient transparency with respect to the function symbols 9, 11 when illuminated with transmitted light from the rear or bottom side 1*a* of the insert piece 1. In addition, on the other side of the insert piece 1, sufficient reflection is produced with illumination by direct light of the function symbols 9, 11 or of the parallel top surfaces of the raised structures 7.

Following the above step of the first preferred process, the insert piece 1 is extrusion-coated with a non-transparent material 17 in such manner that the coating 17 covers at least those parts of the surface 5 of the insert piece 1 which surround the function symbols 9, 11. Preferably, the step of covering the first surface 5 of the transparent support element 1 with the non-transparent material 17 is performed in a subsequent extrusion step using, for example, a black color non-transparent material.

With a view toward designing the extrusion mold to be as simple as possible, it is preferred that the surface 19 of the finished headlamp piece, actuation piece or other part is flush with the surfaces 7*a* of the raised structures. It is possible, however, that the surfaces 7*a* can also project beyond the top surface 19, whereby, in such case, the required recessed structures in the extrusion mold must be formed to correspond with the raised structures 7 of the insert piece. In that case, the corresponding recessed structures in the extrusion mold can be used, or at least can be used to contribute to the alignment and fastening of the insert piece 1.

As can be seen from FIG. 1, no sharp edges are formed between the surfaces 7*a* and 19. Such gradual transitions without sharp edges have the benefit that the surface of the finished piece has fewer spots where dirt tends to collect and, further, it is easier to clean.

In the specific embodiment shown in FIG. 1, application of the colored transparent layers 13, 15 is performed in such a manner that, essentially, the coating is only applied to the top surfaces of the raised structures 7 and, to a lesser extent, to a smaller area of the descending flanks of the raised structures 7. In case both function symbols 9, 11 are to be produced in the same color, it is, however, also possible to coat the entire surface 5 of the insert piece 1 with the respective single transparent color.

When the function symbols are selectively produced, for example, having different colors, it is only necessary to coat the respective structure 7 or at least its top surface, with a different color than the respective top surface of the raised structure 7, creating the function symbol 9.

In an alternative embodiment (not shown), a function symbol is produced without coating the respective structure 7 with a transparent color. Rather, in that case, the color of the respective function symbol is determined by the color of the material of the insert piece 1 itself.

In order to produce the color layers 13, 15, a color is selected that resists the high temperature of the extrusion process. Color materials specifically suitable for laser etching are particularly appropriate for that purpose and, accordingly, preferred in the present invention. Preferably, in accordance with the present invention, color materials which are stable in the temperature range >80° C. are used.

Figure 2:
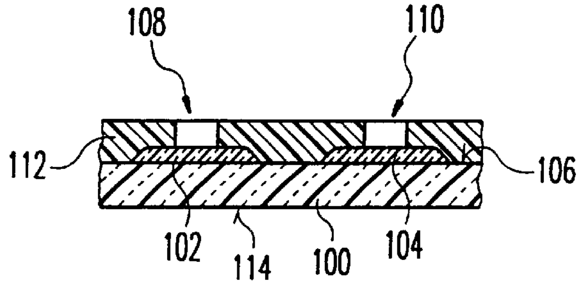
FIG. 2 is a cross-sectional view of an actuation piece or the like produced in accordance with a second preferred embodiment of the invention; and, FIG. 3 is a cross-sectional view of an actuation piece or the like produced in accordance with a third preferred embodiment of the invention.

With reference now to FIG. 2, a cross sectional view is shown of a device formed in accordance with a second preferred embodiment of the invention. To start, a first color layer 102 and a second color layer 104 are applied as coatings onto a support element 100, preferably in the areas of the surface 106 of the support element 100 in which a corresponding function symbol 108 or 110 is to be produced. The transparent color layers 102, 104 preferably have different colors so that different color symbols can be easily produced. Preferably, the support element is transparent.

After the surface 106 of the support element 100 has been coated with the appropriate transparent color layers 102, 104, the surface 106 is completely covered with a non-transparent color layer 112 as shown.

After application of the non-transparent color layer 112, the function symbols 108, 110 are produced in the areas of the color layer 102, 104 by selective removal of selected portions of the non-transparent color layer located above the color layers 102, 104. The selective removal of the portions of the non-transparent color layer leave the appropriate color layers exposed. Preferably, the removal of the selected portions of the non-transparent color layer is performed by a laser-etching manufacturing process. Accordingly, suitable color layer materials are used having sufficient temperature stability to withstand the laser-etching manufacturing process.

In accordance with an alternate embodiment of the invention (not shown) one of the two symbols 108, 110 is produced by eliminating one of the colored layers 102 or 104 so that the color of the symbol is determined by the material of the support element 100. As an example, the support element 100 can be formed of any suitably colored transparent material.

In yet another alternative embodiment of the invention (not shown) application of the color layers 102, 104 can also be performed in such a fashion that the same are applied on the underside 114 of the support element 100 rather than on the surface 106 of same. In such case, there is the advantage that the color layer need not be made from a material suitable for withstanding the laser-etching process. As a consequence, a lower quality color material can be employed.

In the above instances, the support element 100 preferably consists of a clear material and has a corresponding thinness so that, when the resultant piece is illuminated with direct light, the light is reflected at the separation layer between the underside 114 of the support element 100 and the color layer provided thereon, essentially fully returning back to the surface 106 of the support element 100 and reaching the outside through the recess in the color layer 112 forming the respective function symbol.

Figure 3:
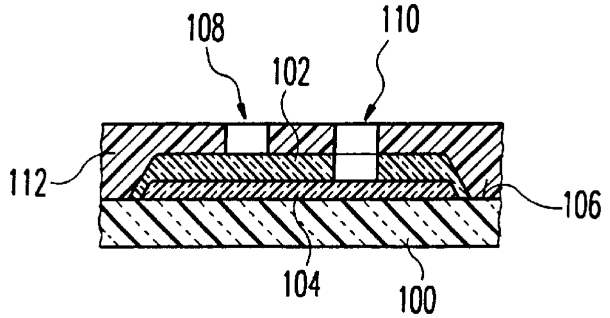

Turning now to FIG. 3, a cross-sectional view of a piece formed according with a third preferred method of the invention is shown. As shown, color layers 102, 104 for producing corresponding function symbols 108, 110 are applied on top of each other and onto the support element 100. As can be seen in the figure, all layers located above the respective color layer are selectively removed for the production of the respective symbol. This is preferably done by laser-etching or any other suitable method.

It is to be appreciated that it is also possible, in the third preferred embodiment of the invention, to produce a symbol by removing all color layers above the surface 106 of the support element 100. Combinations of all previously described methods are also included such as, for example, removal of one or more colored layers, application of the color layers to the underside of the support element 100, and the like.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

What is claimed is:

1. A luminous apparatus with functional symbols for illumination by transmitted light, the apparatus comprising:

a transparent support element having a first surface;

at least one first raised structure extending form the first surface in a first predefined area, the at least one first raised structure being shaped to represent at least one first functional symbol on the transparent support element;

a first transparent color layer on said at least one first raised structure in said first predefined area, the first transparent color layer defining a first secondary surface substantially parallel with said first surface; and a non-transparent material defining a second surface and covering the first surface of the transparent support element in selected areas adjacent said at least one first raised structure without covering said first secondary surface in a manner leaving said first secondary surface exposed between portions of said non-transparent material on the support element thereby defining the spatial extent of the functional symbols, wherein the second surface is substantially flush with said first secondary surface.

2. The luminous apparatus according to claim 1 further including:

at least one second raised structure extending from the first surface in a second predefined area, the at least one second raised structure being shaped to represent at least one second functional symbol on the transparent support element;

a second transparent color layer on said at least one second raised structure in said second predefined area, the second transparent color layer defining a second secondary surface substantially parallel with said first surface; and, wherein said non-transparent material covers the first surface of the transparent support element in said selected areas adjacent said at least one second raised structure without covering said second secondary surface in a manner leaving said second secondary surface exposed between portions of said non-transparent material on the support structure, said non-transparent material defining the spatial extent of the at least one second functional symbol.

3. The luminous apparatus according to claim 1 wherein said first transparent color layer includes a layer of color material temperature stable above 80° C. disposed on said at least one first raised structure.

4. The luminous apparatus according to claim 1 wherein at least one of said first transparent color layer and said non-transparent material is formed of a foil material.

5. The luminous apparatus according to claim 1 wherein the first transparent color layer includes an extension that extends over at least a portion of the first surface, said extension being disposed between the transparent support element and the non-transparent material.

6. A method of manufacturing an apparatus with functional symbols adapted for illumination by transmitted light, the method comprising the steps of:

providing a support element having a first surface and at least one first raised structure extending from the first surface in a predefined area, the at least one first raised structure being shaped to represent at least one functional symbol on the support element;

applying a first transparent color layer at least onto said first raised structure in said predefined area, the first transparent color layer defining a second surface substantially parallel with said first surface; and, covering, subsequent to the applying of the first transparent color layer, at least the first surface of the support element with a non-transparent material in selected areas adjacent said at least one first raised structure in a manner leaving said second surface exposed between portions of said non-transparent material on the support element thereby defining the spatial extent of the functional symbols.

7. The method of manufacturing an apparatus with functional symbols according to claim 6 wherein the step of providing includes providing a transparent support element having said first surface and first and second raised structures extending from the first surface in a predefined area, the first and second raised structures being shaped to represent a first functional symbol and a second functional symbol, respectively, on the transparent support element.

8. The method of manufacturing an apparatus with functional symbols according to claim 7 wherein:

the step of applying said first transparent color layer includes applying said first transparent color layer onto said first raised structure and applying a second transparent color layer onto said second raised structure; and, the step of covering includes covering the first surface of the transparent support element with said non-transparent material in selected areas adjacent said first and second raised structures without covering said first and second transparent color layers.

9. The method of manufacturing an apparatus with functional symbols according to claim 7 wherein the step of covering includes covering the first surface of the transparent support element with said non-transparent material in selected areas adjacent said first and second raised structures.

10. The method of manufacturing apparatus with functional symbols according to claim 6 wherein:

the step of providing includes providing a transparent support element having a first surface and a plurality of raised structures extending from the first surface in predefined areas, the plurality of first raised structures being shaped to respectively represent functional symbols on the transparent support element;

the step of applying includes applying a plurality of transparent color layers onto said plurality of raised structures in said predefined areas, the plurality of transparent color layers defining a plurality of second surfaces substantially parallel with said first surface; and, the step of covering includes covering the first surface of the transparent support element with said non-transparent material in selected areas adjacent said plurality of raised structures without covering said plurality of second surfaces in a manner leaving said plurality of second surfaces exposed between portions of said non-transparent material on the support element.

11. The method of manufacturing an apparatus with functional symbols according to claim 6 wherein the step of covering the first surface of the support element with said non-transparent material includes covering the first surface of a transparent support element with said non-transparent material in areas surrounding said at least one first raised structure without covering said second surface in a manner to completely cover said first surface of the support element while leaving said second surface exposed.

12. The method of manufacturing an apparatus with functional symbols according to claim 6 wherein:

the step of applying said first transparent color layer includes applying a layer of material being temperature stable above 80° C. onto said first raised structure; and, the step of covering the first surface of the support element includes extrusion coating the first surface of a transparent support element with said non-transparent material in said selected areas without covering said second surface.

13. The method of manufacturing an apparatus with functional symbols according to claim 6 wherein:

the step of applying a first transparent color layer at least onto said first raised structure in said predefined area includes applying the first transparent color layer over an area including at least a first portion of the first surface of the support element; and the step of covering includes covering a portion of the first transparent color layer that extends over the first portion of the first surface of the support element.

* * * * *